(12) United States Patent
Wallace

(10) Patent No.: US 10,011,506 B2
(45) Date of Patent: Jul. 3, 2018

(54) SYSTEM FOR REMOVING MINERALS FROM A BRINE USING ELECTRODIALYSIS

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

(*) Notice: Subject to any disclaimer, the term of this patent is extended or adjusted under 35 U.S.C. 154(b) by 481 days.

(21) Appl. No.: 14/421,427

(22) PCT Filed: Aug. 13, 2013

(86) PCT No.: PCT/US2013/054694
§ 371 (c)(1),
(2) Date: Feb. 12, 2015

(87) PCT Pub. No.: WO2014/028465
PCT Pub. Date: Feb. 20, 2014

(65) Prior Publication Data
US 2015/0203377 A1 Jul. 23, 2015

Related U.S. Application Data

(60) Provisional application No. 61/682,585, filed on Aug. 13, 2012.

(51) Int. Cl.
*C02F 1/469* (2006.01)
*C02F 9/00* (2006.01)
(Continued)

(52) U.S. Cl.
CPC ............ *C02F 1/4693* (2013.01); *B01D 61/44* (2013.01); *B01D 61/58* (2013.01); *C02F 1/4695* (2013.01);
(Continued)

(58) Field of Classification Search
CPC ........ C02F 1/42; C02F 1/4693; B01D 61/422; B01D 61/44; B01D 61/46; B01D 61/50
See application file for complete search history.

(56) References Cited

U.S. PATENT DOCUMENTS 3,475,122 A 10/1969 McRae et al.
3,728,248 A * 4/1973 Boari ................ B01J 39/04
204/632
(Continued)

OTHER PUBLICATIONS

Eriksson et al., NF membrane characteristics and evaluation for sea water processing applications, Apr. 16, 2005, Desalination vol. 184.
(Continued)

*Primary Examiner* — Ibrahime A Abraham
*Assistant Examiner* — Salil Jain
(74) *Attorney, Agent, or Firm* — Fletcher Yoder, P.C.

(57) ABSTRACT

A system for removing minerals from a brine using electrodialysis. One system includes a gypsum removal system configured to receive a feed stream having a first amount of gypsum, to extract at least a portion of the gypsum from the feed stream, and to produce a first output having a second amount of the gypsum less than the first amount of the gypsum. The system also includes an electrodialysis (ED) system fluidly coupled to the gypsum removal system and configured to receive the first output from the gypsum removal system, to produce a second output having a substantially sulfate hardness free sodium sulfate solution, to produce a third output having a sodium chloride solution, and to produce a fourth output having a mineral solution.

19 Claims, 5 Drawing Sheets

(51) Int. Cl.
*B01D 61/44* (2006.01)
*B01D 61/58* (2006.01)
*C02F 1/04* (2006.01)
*C02F 1/20* (2006.01)
*C02F 1/28* (2006.01)
*C02F 1/42* (2006.01)
*C02F 1/44* (2006.01)
*C02F 1/52* (2006.01)
*C02F 1/72* (2006.01)
*C02F 1/00* (2006.01)
*C02F 101/10* (2006.01)
*C02F 101/12* (2006.01)
*C02F 103/08* (2006.01)
*B01D 61/02* (2006.01)

(52) U.S. Cl.
CPC .............. *C02F 9/00* (2013.01); *B01D 61/027* (2013.01); *B01D 2317/08* (2013.01); *B01D 2319/06* (2013.01); *C02F 1/048* (2013.01); *C02F 1/20* (2013.01); *C02F 1/28* (2013.01); *C02F 1/42* (2013.01); *C02F 1/441* (2013.01); *C02F 1/442* (2013.01); *C02F 1/52* (2013.01); *C02F 1/72* (2013.01); *C02F 2001/007* (2013.01); *C02F 2101/10* (2013.01); *C02F 2101/103* (2013.01); *C02F 2101/106* (2013.01); *C02F 2101/108* (2013.01); *C02F 2101/12* (2013.01); *C02F 2103/08* (2013.01); *C02F 2301/08* (2013.01)

(56) References Cited

U.S. PATENT DOCUMENTS

| | | | |
|---|---|---|---|
| 4,141,825 A * | 2/1979 | Conger | B01D 61/58 204/518 |
| 4,298,442 A | 11/1981 | Giuffrida | |
| 4,434,057 A * | 2/1984 | Marquardt | B01D 61/025 203/39 |
| 4,980,077 A | 12/1990 | Morris et al. | |
| 5,270,026 A | 12/1993 | College et al. | |
| 5,858,240 A | 1/1999 | Twardowski et al. | |
| 6,482,305 B1 | 11/2002 | Mani | |
| 7,083,730 B2 | 8/2006 | Davis | |
| 7,392,848 B1 | 7/2008 | Bader | |
| 7,459,088 B2 | 12/2008 | Davis | |
| 7,501,064 B2 | 3/2009 | Schmidt et al. | |
| 7,595,001 B2 | 9/2009 | Arakel et al. | |
| 7,658,852 B2 | 2/2010 | Liberman | |
| 2006/0060532 A1 * | 3/2006 | Davis | B01D 61/022 210/652 |
| 2010/0038246 A1 | 2/2010 | Koschuh et al. | |
| 2010/0163471 A1 | 7/2010 | Elyanow et al. | |
| 2011/0132839 A1 | 6/2011 | Zuback et al. | |
| 2011/0180477 A1 * | 7/2011 | Ganzi | B01D 61/44 210/638 |
| 2011/0198285 A1 | 8/2011 | Wallace | |
| 2011/0210069 A1 | 9/2011 | Xiong et al. | |
| 2011/0303607 A1 | 12/2011 | Vora et al. | |
| 2012/0160770 A1 * | 6/2012 | Banerjee | C02F 1/5245 210/638 |
| 2014/0041810 A1 | 2/2014 | Wallace | |
| 2014/0042029 A1 | 2/2014 | Wallace | |
| 2014/0042061 A1 | 2/2014 | Wallace | |
| 2014/0044485 A1 | 2/2014 | Wallace | |
| 2014/0045248 A1 | 2/2014 | Wallace | |
| 2014/0183045 A1 * | 7/2014 | Fu | C02F 1/4691 204/520 |

OTHER PUBLICATIONS

Kabay et al., Separation of monovalent and divalent ions from ternary mixtures by electrodialysis, Feb. 7, 2006, Desalination vol. 198.

International Search Report for Application No. PCT/US13/54694 dated Jan. 7, 2014.

* cited by examiner

SYSTEM FOR REMOVING MINERALS FROM A BRINE USING ELECTRODIALYSIS

CROSS REFERENCE TO RELATED APPLICATIONS

This application is a national stage of PCT Application No. PCT/US13/54694 entitled "SYSTEM FOR REMOVING MINERALS FROM A BRIEF USING ELECTRODIALYSIS", filed on Aug. 13, 2013, which claims priority from and the benefit of U.S. Provisional Patent Application No. 61/682,585, entitled "SYSTEM FOR REMOVING MINERALS FROM A BRINE USING ELECTRODIALYSIS", filed Aug. 13, 2012. Each of the foregoing applications is hereby incorporated by reference in its entirety.

The following applications are also incorporated by reference in their entirety:

U.S. Provisional Patent Application No. 61/682,590, entitled "Heating System for Desalination" filed Aug. 13, 2012, U.S. Provisional Patent Application No. 61/682,596, entitled "System for Removing High Purity Salt from a Brine" filed Aug. 13, 2012, U.S. Provisional Patent Application No. 61/682,603, entitled "System for Rinsing Electrodialysis Electrodes" filed Aug. 13, 2012, U.S. Provisional Patent Application No. 61/682,609, entitled "System for Removing Selenium from a Feed Stream" filed Aug. 13, 2012, and U.S. Provisional Patent Application No. 61/682,612, entitled "System for Producing a Gypsum Slurry for Irrigation" filed Aug. 13, 2012.

BACKGROUND

The subject matter disclosed herein relates generally to mineral extraction and, more particularly, a system for removing minerals from a brine using electrodialysis.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, the need for innovative technologies and alternative water supplies for both drinking water and agriculture is important. One method for obtaining an alternative source of potable water uses desalination systems to produce the potable water.

The desalination process involves the removal of salts from seawater, agricultural run-off water, and/or brackish ground water brines to produce potable water. Desalination may use an assortment of filtration methods, such as nanofiltration and reverse osmosis, to separate the raw stream into a desalinated water stream and a tailing stream. The tailing streams may contain various salts and other materials left over after the desalination process. Indeed, disposal of the tailing streams produced by desalination may result in soil degradation and ground water contamination. Thus, alternative and innovative uses of the tailing streams may reduce undesirable results of disposing the tailing streams.

One such alternative use involves processing the tailing stream to remove valuable minerals. In particular, inland brackish water and seawater may be rich in sulfates, magnesium, calcium, and other minerals. Sulfates, mainly in the form of gypsum, have a variety of commercial uses, including, but not limited to building materials (e.g., drywall or sheetrock), skin creams, shampoos, and dental impression plasters. In addition, gypsum may be used as a fertilizer and/or soil conditioner in the farming industry. Magnesium may also be extracted in the form of magnesia (e.g., magnesium oxide) which is used in the refractory industry due to its fireproofing capabilities as well as in the medical field as an ingredient in laxatives. As the traditional deposits for these minerals are depleted, the capacity to extract them from alternative sources represents both a valuable commercial opportunity as well as a means for lessening the environmental impact caused by the disposal of waste streams high in salt content.

Existing procedures for the removal of minerals often exhibits sub-optimal efficiency. For example, evaporation pools require a large area of land and often produce low purity mixed salts with minimal commercial value. In addition, a waste mixed salt solid resulting from the evaporation process may leach into the ground water supply. Other methods of extraction involve processing the tailing stream produced in brackish water or seawater desalination plants. However, current mineral extraction procedures of the tailing stream may not operate efficiently.

As described above, desalination systems may employ one of a combination of nanofiltration and reverse osmosis to facilitate the desalination and removal process. Following an initial separation of potable water stream from a tailing stream, the tailing stream may be processed further by a mineral removal system. For example, various precipitation techniques may be performed that facilitate removal of dissolved minerals out of a solution. However, the high salt concentration in the tailing stream may increase the solubility of many of these valuable minerals and, as a consequence, decrease the efficiency in which these minerals may be precipitated. Inadequate removal of these minerals may have a negative impact on the mineral removal system itself. For example, incomplete gypsum removal may result in scaling of filtration and/or reverse osmoses membranes, thereby reducing the life and permeate flux of these membranes. Frequent replacement and repair of such mineral removal system components, in addition to the sub-optimal extraction efficiency, may result in elevated cost of mineral removal prompting the need for further optimization of the mineral removal system.

Furthermore, existing procedures may be inadequate to remove impurities from minerals. The ineffective removal of such impurities, including arsenic, boric acid, and silica, may result in undesirable impurities in removed minerals and decreased productivity of the mineral removal plant due to membrane scaling. Thus, an improved mineral removal system may facilitate higher purity of valuable minerals, decrease impurities, increase efficiency, and increase the life-span of components of the mineral removal system.

BRIEF DESCRIPTION

In one embodiment, a system for removing minerals from a feed stream includes a gypsum removal system configured to receive the feed stream having a first amount of gypsum, to extract at least a portion of the gypsum from the feed stream, and to produce a first output having a second amount of the gypsum less than the first amount of the gypsum. The system also includes an electrodialysis (ED) system fluidly coupled to the gypsum removal system and configured to receive the first output from the gypsum removal system, to produce a second output having a substantially sulfate hardness free sodium sulfate solution, to produce a third output having a sodium chloride solution, and to produce a fourth output having a mineral solution.

In another embodiment, a system for removing minerals from a feed stream includes an ED system. The ED system includes a first ED unit configured to receive the feed stream, to produce a first output having a substantially sulfate hardness free sodium sulfate solution, and to produce an intermediate output. The ED system also includes a second ED unit configured to receive the intermediate output, to produce a second output having a sodium chloride solution, and to produce a third output having a mineral solution.

In another embodiment, a method for removing minerals from a feed stream includes directing the feed stream into a first ED unit of an ED system. The method also includes producing a first output of the first ED unit. The first output includes a substantially sulfate hardness free sodium sulfate solution. The method includes producing an intermediate output of the first ED unit. The method also includes providing the intermediate output to a second ED unit of the ED system. The method includes producing a second output of the second ED unit. The second output includes a sodium chloride solution. The method also includes producing a third output of the second ED unit. The third output includes a mineral solution.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
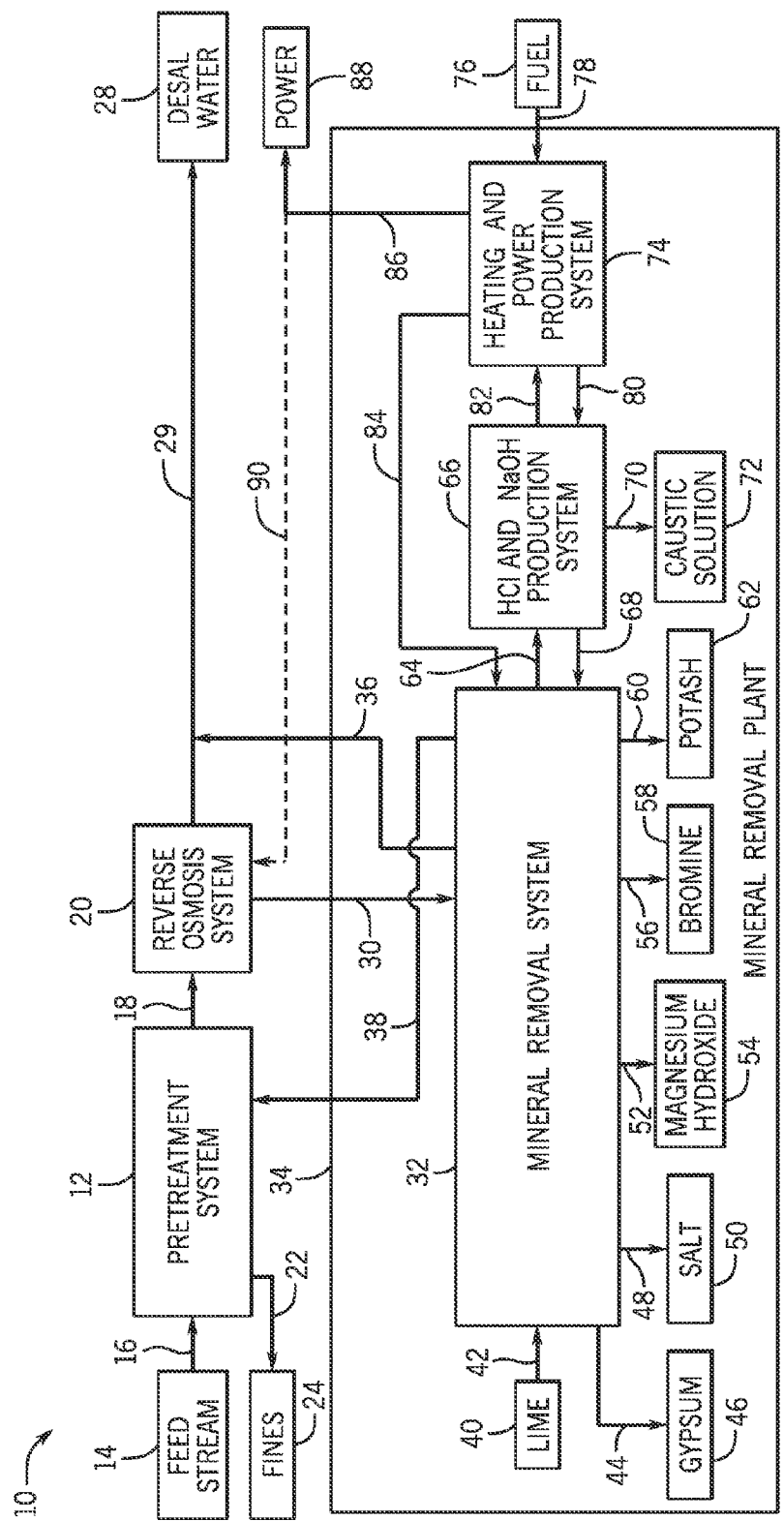
FIG. 1 is a block diagram of an embodiment of a water processing system, in accordance with aspects of the present disclosure.

FIG. 1 is a block diagram of an embodiment of a water processing system 10. The water processing system 10 is used to produce desalinated water from a feed stream and to remove minerals from the feed stream. For example, the water processing system 10 may be used to produce high purity agricultural grade gypsum (e.g., approximately greater than 97 wt % gypsum on a dry basis), industrial grade caustic (e.g., approximately greater than 97 wt % NaOH on a dry basis), industrial grade magnesium hydroxide (e.g., approximately greater than 98 wt % MgO on an ignited basis, or on an ignited oxide basis) suitable for industrial magnesia refractory, industrial grade sodium chloride (e.g., approximately greater than 99.9 wt % NaCl on a dry basis), and/or desalinated water (e.g., approximately less than 1000 wppm total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14 as an input 16. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca+Mg, and/or approximately 0.01 to 0.30 g/l $SiO_2$. Furthermore, in certain embodiments, the feed stream 14 may have a pH range between approximately 5 and 9. Specifically, the feed stream 14 may have a pH of approximately 8.

The pretreatment system 12 receives the feed stream 14 and removes solid materials (e.g., fines) from the feed stream 14. The pretreatment system 12 provides the pretreated feed stream 14 as a first output 18 to a reverse osmosis (RO) system 20. Moreover, the pretreatment system 12 provides a second output 22 that contains fines 24, such as iron (Fe) and manganese (Mn). The RO system 20 receives the pretreated feed stream 14 and produces desalinated water 28 as a first output 29. In certain embodiments, the desalinated water 28 may include $SiO_2$. Moreover, the desalinated water 28 may have a pH of approximately 7.5. Furthermore, the RO system 20 provides a brine stream as a second output 30 to a mineral removal system 32. In certain embodiments, the desalinated water 28 may be approximately 70 to 90 percent of the output from the RO system 20, and the brine stream may be approximately 10 to 30 percent of the output from the RO system 20. Specifically, in some embodiments, the desalinated water 28 may be approximately 80 percent of the output from the RO system 20, and the brine stream may be approximately 20 percent of the output from the RO system 20. As may be appreciated, while the illustrated embodiment uses the RO system 20, other embodiments may use NF in place of RO.

The mineral removal system 32 is part of a mineral removal plant 34. The mineral removal plant 34 is configured to remove minerals, elements, and/or compounds from the brine stream. As may be appreciated, the brine stream may be provided to the mineral removal plant 34 from any suitable source and/or system. In certain embodiments, the brine stream may include substantial amounts of sodium chloride, sulfate, calcium, and/or magnesium. The mineral removal system 32 may provide one or more outputs 36 that include desalinated water (which may contain silicon dioxide). Furthermore, the one or more outputs 36 may include a disinfectant and/or oxidant. The disinfectant and/or oxidant may be provided to the pretreatment system 12 via an output 38.

A lime based material 40 (e.g., lime, quick lime, dolomitic lime, etc.) may be provided to an input 42 of the mineral removal system 32 to facilitate mineral removal from the brine stream. The mineral removal system 32 may be configured to remove any suitable mineral, elements, and/or compounds from the brine stream. For example, the mineral removal system 32 may provide a first output 44 including gypsum 46 (e.g., agricultural grade gypsum), a second output 48 including salt 50 (e.g., industrial grade sodium chloride), a third output 52 including magnesium hydroxide 54 (e.g., industrial grade magnesium hydroxide), a fourth output 56 including bromine 58, and/or a fifth output 60 including potash 62.

In certain embodiments, the mineral removal system 32 may provide one or more outputs 64 to a hydrochloric acid (HCl) and sodium hydroxide (NaOH) production system 66. Furthermore, the mineral removal system 32 may receive one or more inputs 68 from the HCl and NaOH production system 66. For example, the mineral removal system 32 may provide a sodium chloride brine to the HCl and NaOH production system 66. Moreover, the mineral removal system 32 may receive HCl, caustic, and/or NaOH produced by the HCl and NaOH production system 66. In certain embodiments, the HCl and NaOH production system 66 may provide an output 72 of a caustic solution 70 (e.g., NaOH) or HCl solution that is not used by the mineral removal system 32 (e.g., produced to be sold).

The mineral removal plant 34 also includes a heating and power production system 74. In certain embodiments, the heating and power production system 74 may include a natural gas engine and/or a boiler. The heating and power production system 74 is configured to receive a fuel 76 at an input 78. The fuel 76 may be any suitable fuel, such as natural gas. The heating and power production system 74 is configured to provide one or more outputs 80 to the HCl and NaOH production system 66. The one or more outputs 80 may include power, steam, hot water, any suitable heated fluid, and so forth. Moreover, the heating and power production system 74 is configured to receive a cooled fluid (such as water) via one or more inputs 82. As illustrated, the heating and power production system 74 is configured to provide power to the mineral removal system 32 via a first output 84. Moreover, the heating and power production system 74 includes a second output 86 configured to provide power 88 to another system and/or to provide a power output 90 to the RO system 20.

Figure 2:
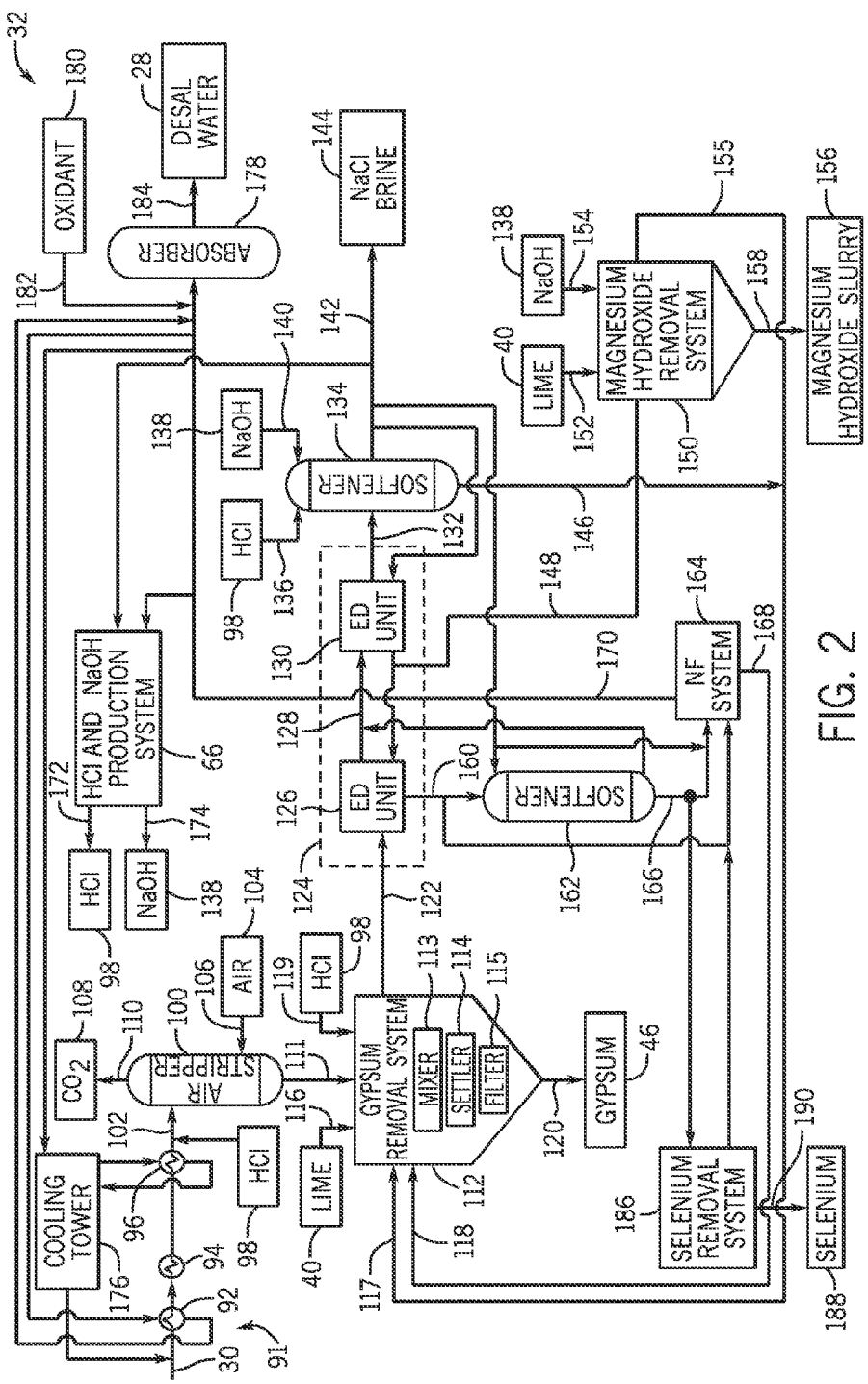
FIG. 2 is a block diagram of an embodiment of a mineral removal system, in accordance with aspects of the present disclosure.

FIG. 2 is a block diagram of an embodiment of the mineral removal system 32. As previously described, the mineral removal system 32 receives at an input the brine stream from the output 30 of the RO system 20. As may be appreciated, the brine stream may contain various elements and/or compounds. For example, the brine stream may contain NaCl, $SO_4$, Ca, Mg, and/or $SiO_2$. In certain embodiments, the brine stream may contain approximately 3.0 to 8.0 g/l NaCl, approximately 3,000 to 8,000 weight parts per million (wppm) $SO_4$, approximately 100 to 400 wppm Mg, approximately 200 to 600 wppm Ca, and/or approximately 50 to 200 wppm $SiO_2$. Furthermore, in certain embodiments, the brine stream may have a pH range between approximately 4 and 8. Specifically, the brine stream may have a pH of approximately 6. In the illustrated embodiment, a temperature control system 91 is used to control heating of the brine stream. Moreover, the temperature control system 91 includes a first heat exchanger 92, a second heat exchanger 94, and a third heat exchanger 96 to aid in controlling the temperature of the brine stream.

The brine stream is mixed with HCl 98 to convert bicarbonate ($HCO_3^-$) and carbonate ($CO_3^{2-}$) in the brine stream to $CO_2$, thereby decreasing the pH to less than 4. The acidified brine stream is routed to an air stripper 100 via a first input 102. The air stripper 100 uses air 104 provided to a second input 106 of the air stripper 100 to facilitate removal of the $CO_2$ 108 from the brine stream via a first output 110. In certain embodiments, multiple stages are used in the air stripper 100 to enable a low residual (e.g., less than approximately 2 ppm). As may be appreciated, a low $CO_2$ residual may inhibit carbonate reformation and scaling when the pH of the brine stream is increased during the various downstream brine treatment steps.

The $CO_2$ stripped brine stream is provided via a second output 111 of the air stripper 100 to a gypsum removal system 112. The gypsum removal system 112 may include a mixer 113, a settler 114, and a filter 115 to facilitate removal of the gypsum 46 from the brine stream (e.g., feed stream). Accordingly, within the mixer 113, the $CO_2$ stripped brine stream is mixed with: the lime based material 40 (e.g., lime, quick lime, dolomitic lime, etc.) received by a first input 116 of the gypsum removal system 112, recycled concentrated calcium chloride ($CaCl_2$) brine (e.g., such as a brine containing approximately 4 to 25 wt % $CaCl_2$) received by a second input 117, and recycled NF non-permeate (e.g., a sodium sulfate ($Na_2SO_4$) rich brine) received by a third input 118. In certain embodiments, such as embodiments with feed brines having a lower $Na_2SO_4$ content, the second output 111 may bypass the gypsum removal system 112. Accordingly, only the second input 117 and the third input 118 may be provided to the gypsum removal system 112. Furthermore, in such an embodiment, the second output 111 may be mixed with a brine output stream 122 from the gypsum removal system 112.

HCl 98 may be added to the gypsum removal system 112 via a fourth input 119. In certain embodiments, the lime based material 40 and the HCl 98 may be pre-mixed into the recycle calcium chloride brine stream to increase calcium content in the mixer 113 of the gypsum removal system 112 and/or in the mineral removal system 32. For example, this may be beneficial when the $SO_4$ to (Mg+Ca) molar ratio is greater than approximately 1.0 since it provides supplemental calcium to allow substantial (e.g., complete, nearly complete, etc.) sulfate removal as gypsum 46. In other embodiments, commercial calcium chloride brine, flakes, or pellets may be added to the mixer 113 of the gypsum removal system 112 when the brine stream is deficient in calcium. Furthermore, in certain embodiments, HCl 98 and limestone may also be added to the recycle calcium chloride brine and the brine stripped in a second air stripper to remove the residual $CO_2$. As may be appreciated, limestone may be procured at a lower cost than lime; however, the second air stripper may be necessitated by the use of the limestone.

The overall molar ratio of Ca to $SO_4$ in the brine stream entering the gypsum removal system 112 may be controlled to approximately 0.8 to 1.2 by calcium addition to the mixer 113 (e.g., HCl 98 plus the lime based material 40, $CaCl_2$, and/or HCl 98 plus limestone with additional air stripping) as discussed above, and/or by removing a portion of the concentrated $CaCl_2$ brine as a byproduct. Recycled gypsum 46 seed crystals are added to the mixture within the mixer 113 of the gypsum removal system 112. The calcium in the concentrated $CaCl_2$ brine stream reacts with the sulfate in the brine stream received by the gypsum removal system 112 from the air stripper 100 and the recycle NF non-permeate to precipitate gypsum 46. In certain embodiments, approximately 50% to 70% of the sulfate is removed from the brine stream. The presence of gypsum 46 seed crystals in the mixer 113 (e.g., a turbulent mixer) at neutral pH (e.g., a pH of approximately 6 to 8) may facilitate gypsum 46 precipitation kinetics, thereby enabling rapid gypsum precipitation. At the mixer 113 effluent the solution reaches near saturation conditions (e.g., slightly supersaturated) with respect to gypsum 46 and the slurry is pumped to the settler 114.

In addition to gypsum 46 precipitation, insoluble calcium fluoride ($CaF_2$) also precipitates in the mixer 113 thereby removing a substantial portion of the fluoride from the stripped brine stream; thereby inhibiting fluoride scaling in the electrodialysis (ED) system. In the settler 114 the gypsum 46 crystals settle and the saturated near solids free solution is decanted off, and filtered by the filter 115 (e.g., a sand filter, a microfilter, an ultrafilter, and so forth) to remove residual gypsum 46 particles. A small amount of softened salt brine is recycled to the settler 114 overflow to increase gypsum 46 solubility and desaturate the brine stream, thereby inhibiting scaling in the filter 115 and other downstream units. The settler 114 bottoms may be routed to a hydroclone and filter to wash (e.g., with desalinated product water) and concentrate the gypsum 46 into a saleable washed filter cake. In certain embodiments, the filter cake may include approximately 70 to 100 wt % gypsum 46. Specifically, the filter cake may include approximately 90 wt % gypsum 46. Thus, gypsum 46 is provided as an output 120 from the gypsum removal system 112. The fine solids overflow stream from the hydroclone is recycled to the mixer 113 as seed crystals. The filtrate from the filter 115 is recycled to the settler 114.

The gypsum removal system 112 may remove approximately 60 to 75% of the gypsum received from the second output 111 and produces the brine stream output 122 having a reduced amount of gypsum relative to the second output 111. For example, the brine stream output 122 (e.g., recycle brine stream output) may contain less than approximately 5 g/l gypsum, while the second output 111 may contain approximately 12 to 20 g/l gypsum. Furthermore, in certain embodiments, the brine stream output 122 may contain approximately 5.0 to 15.0 g/l NaCl and/or approximately 1,000 to 3,000 wppm $SO_4$. Moreover, the brine stream output 122 may have a pH of approximately 6. The brine stream output 122 is provided to an electrodialysis (ED) system 124. Furthermore, as illustrated, the gypsum removal system 112 is fluidly coupled to the ED system 124. In certain embodiments, a guard cartridge filter may be disposed between the brine stream output 122 and the ED system 124 to filter the brine stream output 122 thereby blocking gypsum scale from passing to the ED system 124. The ED system 124 is configured to receive the brine stream output 122 from the gypsum removal system 112, to produce a substantially sulfate hardness (e.g., Ba, Sr, Ca) free sodium sulfate solution, to produce a sodium chloride solution, and to produce a mineral solution. In the illustrated embodiment, the ED system 124 includes a first ED unit 126 that provides an intermediate output 128 to a second ED unit 130. In certain embodiments, the intermediate output 128 may include approximately 70 to 120 g/l total dissolved solids (TDS).

The first ED unit 126 (e.g., mixed chloride extraction ED) extracts a substantial portion (e.g., approximately 65% to 80%) of the magnesium chloride, calcium chloride, and sodium chloride from the brine stream output 122 using non-permselective cationic membranes and monovalent permselective anionic membranes to produce a concentrated (e.g., approximately 3 to 25 wt %) barium chloride, strontium chloride, magnesium chloride, calcium chloride, sodium chloride brine that is substantially sulfate free that is provided via the intermediate output 128 to the second ED unit 130. At a pH of approximately 6 both boric acid and silica are in a non-ionic form and thus are not extracted by the ED into the intermediate output 128 having the concentrated brine stream. As may be appreciated, barium (Ba), strontium (Sr), magnesium, and calcium chlorides are preferentially extracted versus sodium chloride through non-permselective cation membranes. Thus, a diluate brine output 160 from the first ED unit 126 is a dilute $Na_2SO_4$ brine with reduced barium, strontium, calcium, and magnesium content and very low chloride content (e.g., a substantially sulfate hardness free sodium sulfate solution). For example, the substantially sulfate hardness free sodium sulfate solution may include less than approximately 200 mg/l (Ca+Sr+Ba) and/or approximately 3 to 5 g/l sulfate.

In certain embodiments, the first ED unit 126 may include a two-stage ED configuration for mixed chloride extraction ED. For example, a first stage may extract approximately 70 to 90% of the mixed chlorides as a low sulfate, high concentration product concentrate. Furthermore, a second stage may be fed by the first stage diluate and the brine stream output 122. Residual mixed chlorides in the first stage diluate may be extracted into the brine stream output 122, which may be fed to the first stage, such as illustrated in the ED system 124 of FIG. 5. As may be appreciated, the two-stage design may increase ED power consumption and size, however, the two-stage design may facilitate a sharper separation and higher recoveries of sulfate in relation to the diluate product and chloride in relation to the mixed chloride concentrate product.

In some embodiments, a portion of an NF non-permeate from a segregated fully softened feed may be used as a supplemental rinse solution in cells adjacent to the electrode cells, thereby inhibiting calcium contamination of an electrode rinse solution. The return supplemental rinse solution may be recycled to the gypsum settler 114. Moreover, for seawater based brines, NF permeate may be used as a supplemental rinse solution (due to its high salt content and higher conductivity) which may be recycled back to the NF feed.

The high concentration calcium chloride brine from the intermediate output 128 is provided to the second ED unit 130 (e.g., a NaCl extraction ED) that selectively removes a substantial portion (e.g., approximately 80% to 95%) of the NaCl using monovalent permselective cation and anion membranes. In certain embodiments, the second ED unit 130 may include a two-stage ED configuration for NaCl extraction. For example, a first stage may extract approximately 70 to 90% of the NaCl as a low hardness, high concentration product concentrate. Moreover, the second stage may be fed by the first stage diluate and may produce a low NaCl, $CaCl_2$, $MgCl_2$ rich product diluate, and an intermediate concentration NaCl concentrate with higher hardness, which is recycled back to the feed of the first stage. As may be appreciated, the two-stage design may increase ED power consumption and size; however, the two-stage design may allow for a sharper separation and higher recoveries of $CaCl_2$ and $MgCl_2$ in relation to the diluate product and NaCl in relation to the concentrate product.

Figure 5:
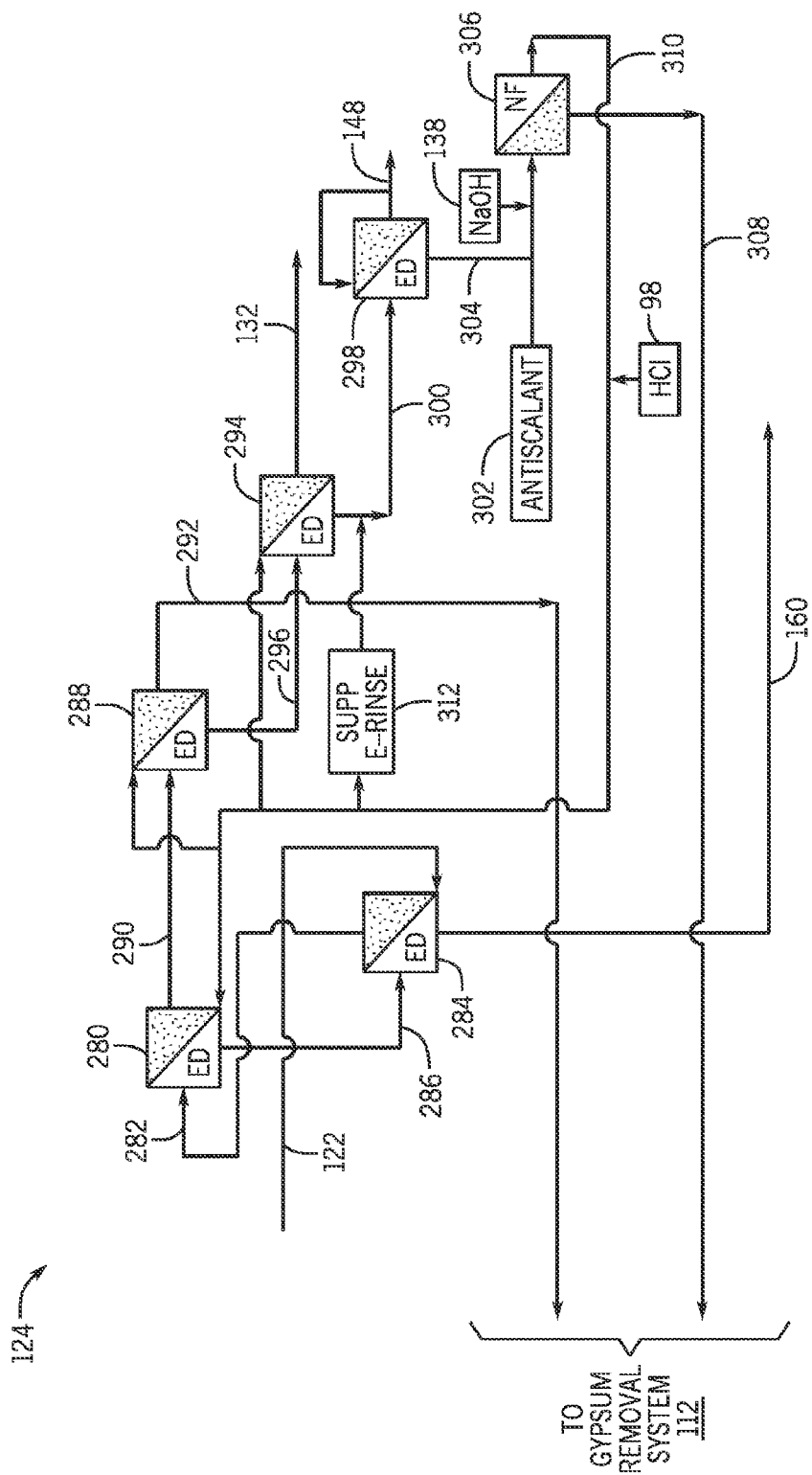
FIG. 5 is an embodiment of an electrodialysis system that may be used in a mineral removal system, in accordance with aspects of the present disclosure.

FIG. 5 is an embodiment of the ED system 124 that may be used in the mineral removal system 32. In the embodiment illustrated in FIG. 5 multiple feed ED stages (as described above) and multiple extraction ED are used to extract multiple chloride brine streams from the mixed chloride intermediate output 128. Although this embodiment may increase a number of extraction ED stages and adds an additional NF unit, the volume of brine that treated by the gypsum removal system and/or the magnesium removal system may be reduced. In the illustrated embodiment, a first stage ED 280 may extract approximately 70-90% of mixed chlorides received from an input 282 as a low sulfate, high concentration product concentrate. Furthermore, a second stage ED 284 may be fed by a first stage diluate 286 and the brine stream output 122. Residual mixed chlorides in the first stage diluate 286 may be extracted into the brine stream output 122, which may be fed to the first stage ED 280.

Furthermore, a first extraction ED 288 (e.g., $BaCl_2/SrCl_2/CaCl_2$ ED) receives an output 290 from the first stage ED 280 and uses non-selective cation membranes and monovalent permselective anion membranes to extract a concentrated (e.g., approximately 200 g/l) brine 292 enriched in $BaCl_2$, $SrCl_2$, $CaCl_2$. Approximately 80% of the Ba, 60% of the Sr, 40% of the Ca and 20% of the Mg is extracted into the concentrate brine 292 which is routed to the gypsum removal system 112. A second extraction ED 294 (e.g., NaCl ED) uses monovalent permselective cationic and anionic membranes to selectively extract approximately 70 to 80% of the remaining NaCl from a diluate 296 from the first extraction ED 288 to produce the concentrated (e.g., approximately 200 to 250 g/l) NaCl brine 132 which is routed to the brine softener 134. A third extraction ED 298 (e.g., $CaCl_2/MgCl_2$ ED) removes approximately 80 to 90% of the remaining Ca and approximately 60 to 70% of the remaining Mg from a diluate 300 from the second extraction ED 294 to produce a concentrated (e.g., approximately 250 to 300 g/l) brine 148 enriched in $CaCl_2$ and $MgCl_2$ which is routed to the magnesium hydroxide removal system 150.

A $CaF_2$ antiscalant 302 (e.g., Vitec® 1000 or Vitec® 3000 produced by Avista Technologies, Inc. of San Marcos, Calif.) is added to a diluate 304 from the third extraction ED 298. Moreover, NaOH 138 is added to increase the pH to approximately 6. The treated diluate 304 is routed to a NF unit 306 which is configured to remove the small amount of sulfate and calcium fluoride as a non-permeate stream 308. The NF non-permeate stream 308 is routed to the gypsum removal system 112. A NF permeate 310 substantially free of sulfate and fluoride is reacidified using the HCl 98 to a pH of approximately 2.5 and recycled back to the concentrate side of the first stage ED 280. A portion of the acidified NF permeate is routed to the concentrate side of the first extraction ED 288 and the second extraction ED 294 as makeup. Another portion of the acidified NF permeate is used for a supplemental rinse 312, as described above, and the spent rinse brine is mixed with the second extraction ED 294 diluate 300 and fed to the third extraction ED 298.

Returning to FIG. 2, a NaCl brine (e.g., sodium chloride solution) is provided as an output 132 from the second ED unit 130. The NaCl brine has a low magnesium content and is provided (e.g., pumped) to an ion exchange brine softener 134 (e.g., such as an Amberlite™ IRC747 manufactured by The Dow Chemical Company of Midland, Mich.) where a substantial portion (e.g., approximately greater than 99%) of the calcium and magnesium are removed. Dilute HCl 98 is provided via an input 136 and NaOH 138 (e.g., approximately 4 wt %) is provided via an input 140 to the softener 134. The HCl 98 and the NaOH 138 are used to regenerate the ion exchange brine softener 134. The ion exchange brine softener 134 provides an output 142 of a high concentration NaCl brine 144. The high concentration NaCl brine 144 may include approximately 150 to 300 g/l NaCl. In certain embodiments, the NaCl brine 144 may be provided to the HCl and NaOH production system 66 to aid in producing HCl and NaOH. Furthermore, the NaCl brine 144 may be used to regenerate a second ion exchange softener 162, such as in brackish water feed brines. Moreover, the NaCl brine 144 may be used to produce a high purity salt for a chlor alkali plant, bleach plant, mixed oxidant plant, other chemical and industrial uses, and/or for any suitable purpose. As illustrated, a purge stream may provide the NaCl brine 144 to the second ED unit 130. The pH of the purge stream may be controlled to approximately 2.5 by HCl 98 injection, thereby converting residual fluoride to hydrogen fluoride (HF) and inhibiting fluorite scaling or NaCl brine contamination with fluoride. In certain embodiments, RO permeate or other low sulfate, low silica, low boric acid containing water may be added to prevent gypsum scaling if there is significant leakage of sulfate through the monovalent anion permselective membrane in the first ED unit 126. A low volume softener reject stream containing the calcium and magnesium may be provided by an output 146 and recycled directly to the settler 114 of the gypsum removal system 112.

The second ED unit 130 produces a concentrated $CaCl_2$, $MgCl_2$ brine stream low in NaCl (e.g., mineral solution) that is provided via an output 148. The output 148 is recirculated to the first ED unit 126 to aid in further extraction of the NaCl and the production of the high concentration NaCl brine 144. Furthermore, the output 148 is provided to a magnesium hydroxide removal system 150. As illustrated, the ED system 124 is fluidly coupled to the magnesium hydroxide removal system 150. In some embodiments (e.g., brackish water), the brine stream may contain approximately 500 to 2,000 wppm $SO_4$ and/or approximately 500 to 2000 wppm Mg, while in other embodiments (e.g., seawater), the brine stream may contain approximately 1,500 to 4,000 wppm $SO_4$ and/or approximately 600 to 2500 wppm Mg. Furthermore, the brine stream may have a pH of approximately 6. Moreover, the brine stream may include approximately 40 to 60 g/l TDS. In certain embodiments, the magnesium hydroxide removal system 150 may include a mixer (e.g., mixer 113), a settler (e.g., settler 114), and a filter (e.g., filter 115) to facilitate removal of the magnesium hydroxide from the concentrated $CaCl_2$, $MgCl_2$ brine stream (e.g., feed stream). In some embodiments, the magnesium hydroxide removal system 150 may be configured to remove approximately 90 to 98% of Mg from the brine stream.

The low NaCl concentrated $CaCl_2/MgCl_2$ product brine from the ED system 124 is enriched in magnesium and lean in sulfate due to the upstream gypsum removal system 112, and the ED system 124. In certain embodiments, the brine provided to the output 148 may be approximately 1 to 15% of the brine stream 30 provided to the mineral removal system 32. The lime based material 40 (e.g., lime, dolomitic lime, etc.) is provided to the magnesium hydroxide removal system 150 via an input 152 to precipitate magnesium hydroxide. A similar arrangement to the gypsum removal system 112 (e.g., mixer 113, settler 114, filter 115, etc.) may be used to produce a washed magnesium hydroxide filter cake and a low magnesium effluent brine. A portion of the magnesium hydroxide removal system 150 effluent may be used to produce a slaked lime slurry to facilitate lime mixing with the $CaCl_2/MgCl_2$ ED product brine. In addition to the lime based material 40, excess NaOH 138, such as from the HCl and NaOH production system 66, may be provided to the magnesium hydroxide removal system 150 via an input 154, thereby facilitating a reduction in the lime based material 40 and/or reducing the $CaCl_2$ export for brines with high (Ca+Mg) to $SO_4$ molar feed ratios (e.g., where the ratio of (Ca+Mg) to $SO_4$ is greater than approximately 1.0).

Overflow from a settler of the magnesium hydroxide removal system 150 may provide an output 155 of concentrated $CaCl_2$ brine that is recycled back to the gypsum removal system 112. The $CaCl_2$ in the brine combines with sulfate in the primary gypsum settler 114 to facilitate precipitation of gypsum 46. In certain embodiments, the output 155 may have a pH of approximately 10. The magnesium hydroxide removal system 150 outputs magnesium hydroxide slurry 156 via an output 158. In certain embodiments, the magnesium hydroxide slurry 156 may include greater than approximately 98 wt % magnesium oxide (MgO) on a calcinated basis.

Returning to the first ED unit 126, the first ED unit 126 provides an ED dilute stream (e.g., a substantially sulfate hardness free sodium sulfate solution) to an output 160. Moreover, for low salinity brackish water feeds (e.g., NaCl less than approximately 10 g/l) provided to the mineral removal system 32, the ED diluate stream from the first ED unit 126 has a TDS content of less than approximately 7 g/l (e.g., 5 g/l). Accordingly, as illustrated, the ED diluate stream from the first ED unit 126 is provided to a strong acid cation (SAC) ion exchange softener 162. The lower TDS content of the ED diluate stream enables the use of SAC ion exchange softening resins which are regenerated using NaCl brine 144, as discussed previously. The SAC ion exchange softener 162 exchanges calcium and magnesium ions in the ED diluate stream for sodium and inhibits gypsum scaling in a downstream NF system 164 that receives an output 166 from the SAC ion exchange softener 162. As illustrated, a purge stream of the NaCl brine 144 may be provided to the NF system 164 in conjunction with the output 166 to facilitate descaling.

All or part of the ED diluate stream is routed to the SAC ion exchange softener 162 based a scaling potential of the NF system 164. Relatively high sulfate hardness levels in the SAC softener effluent 166 (e.g., approximately 10-100 ppm) are used to minimize brine consumption. SAC ion exchange softener 162 resins are regenerated using the NaCl brine 144, and the spent brine from regeneration containing mainly $CaCl_2$ and $MgCl_2$ with residual NaCl is routed to the second ED unit 130, thereby facilitating recycling of the residual NaCl for producing the concentrated CaCl2, MgCl2 brine low in NaCl suitable for feed to the magnesium hydroxide removal system 150. As may be appreciated, for seawater based NF brines or high salinity feed brines, softening is not required to inhibit gypsum scaling in the downstream NF system 164. This is because the elevated NaCl content in the NF feed and non-permeate increases the gypsum solubility, thereby inhibiting scaling in the NF unit.

The ED diluate stream from the first ED unit 126, which has been optionally softened by the SAC ion exchange softener 162 is routed to the NF system 164 via outputs 160 and/or 166. In certain embodiments, approximately 60 to 80% of the ED diluate stream permeates the NF. The remaining 20 to 40% NF non-permeate contains substantially all of the sulfate, approximately 60 to 90% of the calcium, approximately 80 to 90% of the magnesium, and approximately 20 to 50% of the NaCl. Thus, a non-permeate stream output from the NF system 164 via output 168 is slightly supersaturated with respect to gypsum 46 (e.g., 1.6 saturation index defined as ion product/Ksp, which corresponds to a dissolved gypsum content of 125% of saturation). Significant scaling does not occur on the NF membranes of the NF system 164 because the kinetics of gypsum crystallization are slow in the NF membranes (e.g., no seed crystals, acidic pH, low mixing turbulence, etc.).

Periodically (e.g., approximately every 6-8 hours) a slug of high purity NaCl brine (e.g., 100-200 g/l NaCl, less than 50 ppm Ca, less than 20 ppm SO4) is injected individually into each NF element of the NF system 164. This may result in a brief (e.g., 30 second) period of reverse flow across the NF membrane in a direct osmosis, high salinity process. The high purity NaCl brine directs the gypsum microcrystals to be removed from the surface of the NF elements and dissolved in the NaCl brine, thereby inhibiting long term growth of gypsum scale since the seed microcrystals are removed before scaling kinetics can accelerate. The supersaturated NF non-permeate containing substantially all of the sulfate is recycled to the settler 114 of the gypsum removal system 112 via the output 168. In certain embodiments, the supersaturated NF non-permeate may contain approximately 8,000 to 12,000 wppm $SO_4$, approximately 300 to 500 wppm Ca, approximately 100 to 300 wppm Mg, approximately 0.8 to 1.5 g/l NaCl, and/or approximately 15 to 25 g/l TDS.

An NF permeate stream is provided via an output 170 from the NF system 164. For low salinity brackish water brine feeds the NF permeate stream may have a low TDS and thereby may meet EPA drinking water standards. Furthermore, as may be appreciated, NF membranes with increased NaCl removal may be desirable to produce drinking water with lower TDS content. It should be noted that the selection of the NF membrane may be made so that silica concentration and scaling does not occur on the NF membrane with high NaCl removal.

As illustrated, the NF permeate stream from output 170 is provided to the HCl and NaOH production system 66. The HCl and NaOH production system 66 is used to produce one or more HCl 98 outputs 172 and/or to produce one or more NaOH 138 outputs 174. Furthermore, the NF permeate stream from output 170 may be provided to the first heat exchanger 92 to facilitate heat transfer from the brine stream 30 to the NF permeate. Moreover, the NF permeate stream from output 170 may be provided to a cooling tower 176 where the NF permeate stream is cooled before flowing through the third heat exchanger 96 to facilitate heat transfer from the brine stream 30 to the NF permeate. As illustrated, the cooling tower 176 may also provide a portion of the NF permeate stream to the brine stream 30.

As may be appreciated, arsenic (e.g., as arsenite) in the brine stream 30 (e.g., from brackish groundwater treatment) may pass through the gypsum removal system 112 and the NF system 164, thereby ending up in the NF permeate stream from the output 170. Accordingly, in certain embodiments, the arsenic is not removed by NF membranes. If necessary to meet drinking water standards the arsenic may be removed from the NF permeate stream using an arsenic absorber 178. Within the arsenic absorber 178, the NF permeate stream is chlorinated with chlorine, sodium hypochlorite, and/or mixed oxidant 180 received via an input 182 thereby converting the arsenite to arsenate. The stream is then routed to a granular ferric hydroxide (GFH) or granular ferric oxide (GFO) absorption bed where the arsenate is absorbed and chemically sequestered as non-leachable ferric arsenate. Periodically the spent GFH or GFO may be removed and/or stored onsite for future arsenic reclaiming. Moreover, fresh GFH or GFO may be provided into the absorption beds. The absence of essentially all the sulfate and chloride in the NF permeate water along with its slightly acidic pH (e.g., approximately 5 to 6), make the GFH or GFO absorption of arsenic highly efficient and cost effective. The desalinated water 28 is provided by an output 184 from the arsenic absorber 178. While the arsenic absorber 178 is included in the illustrated embodiment, other embodiments may not include the arsenic absorber 178. In certain embodiments, the desalinated water 28 may contain approximately 50 to 150 mg/l $SiO_2$, approximately 10 to 50 mg/l Ca+Mg, approximately 0.3 to 0.9 g/l NaCl, and/or approximately 500 to 1000 ppm TDS.

In certain embodiments, a slipstream of the softened ED diluate stream from the first ED unit 126 may be routed to a biological or chemical selenium removal system 186. The selenium may be concentrated in this stream because it typically exists as selenate which has similar properties to sulfate. Moreover, the selenium does not permeate NF or anion monovalent permselective ED membranes and is more soluble than sulfate in the presence of calcium. Thus, the low NaCl, sulfate, $MgCl_2$ and $CaCl_2$ concentration in the ED diluate stream provide optimal conditions for the chemical or biological removal processes. For example, in certain embodiments, the ED diluate stream may contain approximately 3,000 to 5,000 wppm $SO_4$, approximately 100 to 150 wppm Ca, approximately 25 to 75 wppm Mg, and/or approximately 0.5 to 1.0 g/l NaCl. The selenium removal system 186 is configured to remove selenium from the ED diluate stream, to provide selenium 188 from a first output 190, and to provide a substantially selenium free ED diluate stream to the NF system 164.

Figure 3:
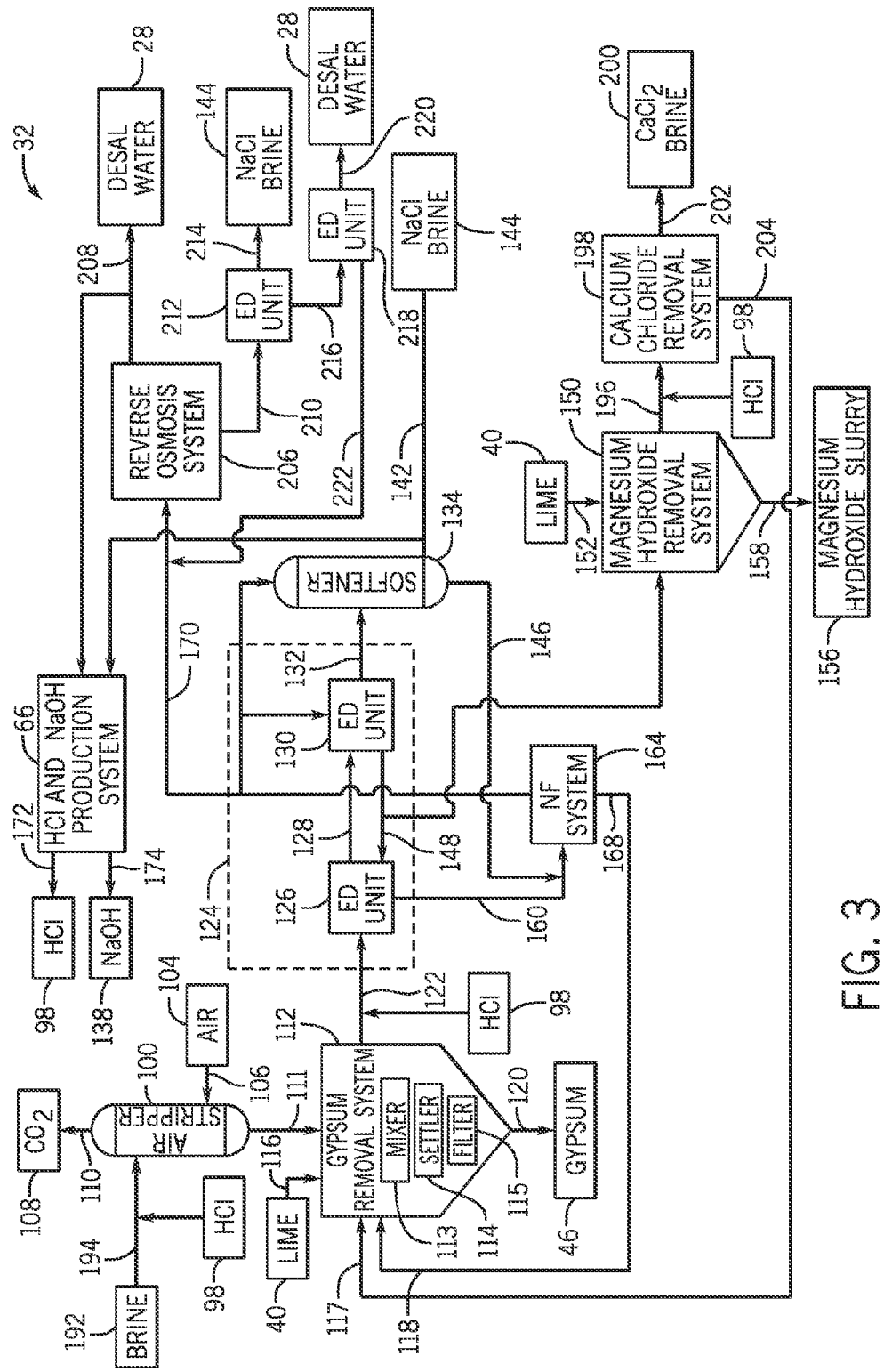
FIG. 3 is a block diagram of another embodiment of a mineral removal system, in accordance with aspects of the present disclosure.

FIG. 3 is a block diagram of another embodiment of the mineral removal system 32. In the illustrated embodiment, a brine stream 192 is provided to the air stripper 100 via an input 194. The brine stream 192 may be received from any suitable source. Furthermore, as may be appreciated, the brine stream may contain various elements and/or compounds. For example, the brine stream may contain NaCl, $SO_4$, Ca, Mg, and/or $SiO_2$. In certain embodiments, the brine stream may contain approximately 25.0 to 35.0 g/l NaCl, approximately 8,000 to 12,000 wppm $SO_4$, approximately 4,000 to 6,000 wppm Mg, approximately 1,200 to 1,800 wppm Ca, and/or approximately 1 to 5 wppm $SiO_2$. Furthermore, in certain embodiments, the brine stream may have a pH range between approximately 4 and 8. Specifically, the brine stream may have a pH of approximately 6.

The air stripper 100 removes $CO_2$ from the brine stream 192 and provides the stripped brine stream 192 to the gypsum removal system 112 via the output 111. In certain embodiments, the stripped brine stream 192 provided by the output 111 of the air stripper 100 may bypass the gypsum removal system 112 and the first ED unit 126, and be fed directly to the NF system 164. Moreover, the gypsum removal system 112 provides the brine stream output 122 to the ED system 124. The brine stream output 122 may have a pH of approximately 8 when it exits the gypsum removal system 112. Accordingly, HCl 98 may be added to the brine stream output 122 to facilitate changing the pH of the brine stream output 122 to a pH of approximately 6. Within the ED system 124, the first ED unit 126 provides the intermediate output 128 to the second ED unit 130. In certain embodiments, the intermediate output 128 includes approximately 170 to 230 g/l TDS.

The second ED unit 130 produces the concentrated $CaCl_2$, $MgCl_2$ brine stream low in NaCl (e.g., mineral solution) that is provided via the output 148. The output 148 is recirculated to the first ED unit 126 to aid in further extraction of the NaCl and the production of the high concentration NaCl brine 144. Furthermore, the output 148 is provided to the magnesium hydroxide removal system 150. In some embodiments, the brine stream may include approximately 100 to 160 g/l TDS. As illustrated, the ED system 124 is fluidly coupled to the magnesium hydroxide removal system 150. Moreover, the magnesium hydroxide removal system 150 may be configured to remove greater than approximately 95% of Mg from the brine stream.

In certain embodiments, all or a portion of the overflow from the settler of the magnesium hydroxide removal system 150 may be filtered and routed via an output 196 to a calcium chloride removal system 198, which may include an ED unit equipped with monovalent anionic selective membranes to extract a concentrated $CaCl_2$ brine 200 (e.g., having approximately 25 to 30 wt %) low in magnesium (e.g., less than approximately 500 mg/l) and/or low in sulfate (e.g., less than approximately 100 mg/l), thereby enabling the concentrated $CaCl_2$ brine 200 to be suitable for the production of drilling brine. Furthermore, as illustrated, the magnesium hydroxide removal system 150 is fluidly coupled to the calcium chloride removal system 198. As may be appreciated, the feed stream provided by the output 196 may have a pH of approximately 10 when it exits the magnesium hydroxide removal system 150. Accordingly, HCl 98 may be added to the feed stream to facilitate changing the pH of the feed stream to approximately 8. The concentrated $CaCl_2$ brine 200 may be provided via an output 202 and may be sold for applications such as road dust suppression, for crude oil drilling brine, and/or may be evaporated to produce commercial grade flakes or pellets. Moreover, the calcium chloride removal system 198 may provide $CaCl_2$ via an output 204 to the gypsum removal system 112. Moreover, the $CaCl_2$ provided via the output 204 may include approximately 80 to 100 g/l $CaCl_2$. The calcium chloride removal system 198 may be used for seawater based brines as well as brines with high Ca+Mg to $SO_4$ molar feed ratios.

The ED diluate from the first ED unit 126 is provided to the NF system 164 via the output 164. In certain embodiments, the ED diluate may include approximately 10 to 20 g/l TDS. Moreover, in certain embodiments, approximately 50 to 70% of the ED diluate stream permeates the NF. The remaining 30 to 50% NF non-permeate may be provided to the gypsum removal system 112. Furthermore, in certain embodiments, the ED diluate from the first ED unit 126 may be recycled back to the seawater NF used to provide the brine stream 192 thereby eliminating the need for the NF system 164. However this may increase the size of the seawater NF unit and the NF non-permeate brine flow to the gypsum settler.

The NaCl brine 144 from the second ED unit 130 may have an increased magnesium content and may be pumped to the soft water regenerated ion exchange brine softener 134 (e.g., such as a Recoflo® softener manufactured by Eco-Tec Inc. of Pickering, Ontario, Canada) in which a substantial portion of the residual magnesium and calcium may be removed. A fraction of the NF permeate stream from the output 170 (having a low calcium and magnesium content) may be used to regenerate the ion exchange brine softener 134. The softener reject stream containing the magnesium and calcium is recycled to the NF system 164 where the calcium and magnesium are removed and recycled to the settler 114 of the gypsum removal system 112. The NF permeate stream from the output 170 may also be used by the second ED unit 130. As may be appreciated, in certain embodiments, the NF permeate stream may include approximately 8 to 12 g/l NaCl.

For high salinity low silica feeds and seawater NF brine feeds the NF permeate from the output 170 is routed to a reverse osmosis (RO) system 206 which produces the desalinated water 28 via an output 208. As illustrated, the desalinated water 28 may be provided to the HCl and NaOH production system 66. The RO non-permeate is routed via an output 210 to a third ED unit 212 (e.g., an NaCl brine ED unit) which uses monoselective anionic and cationic permselective membranes to produce a high concentration, high purity product NaCl brine 144 as a concentrate stream that is provided via an output 214. The third ED unit 212 diluate containing the silica, sulfate, calcium and magnesium is provided via an output 216 and routed to a fourth ED unit 218 (e.g., a second brackish water ED unit) which uses monoselective anionic and cationic permselective membranes to produce desalinated water 28 via an output 220 which contains the silica, sulfate, calcium, magnesium with a low NaCl content (e.g., brackish water ED diluate). The brackish water ED diluate received from the output 220 may be combined with the RO permeate from the output 208 to produce a drinking water that meets the EPA TDS standard of 1000 mg/l. Moreover, the brackish water ED concentrate brine is recycled back to the RO feed via an output 222, for recovery of the NaCl.

Figure 4:
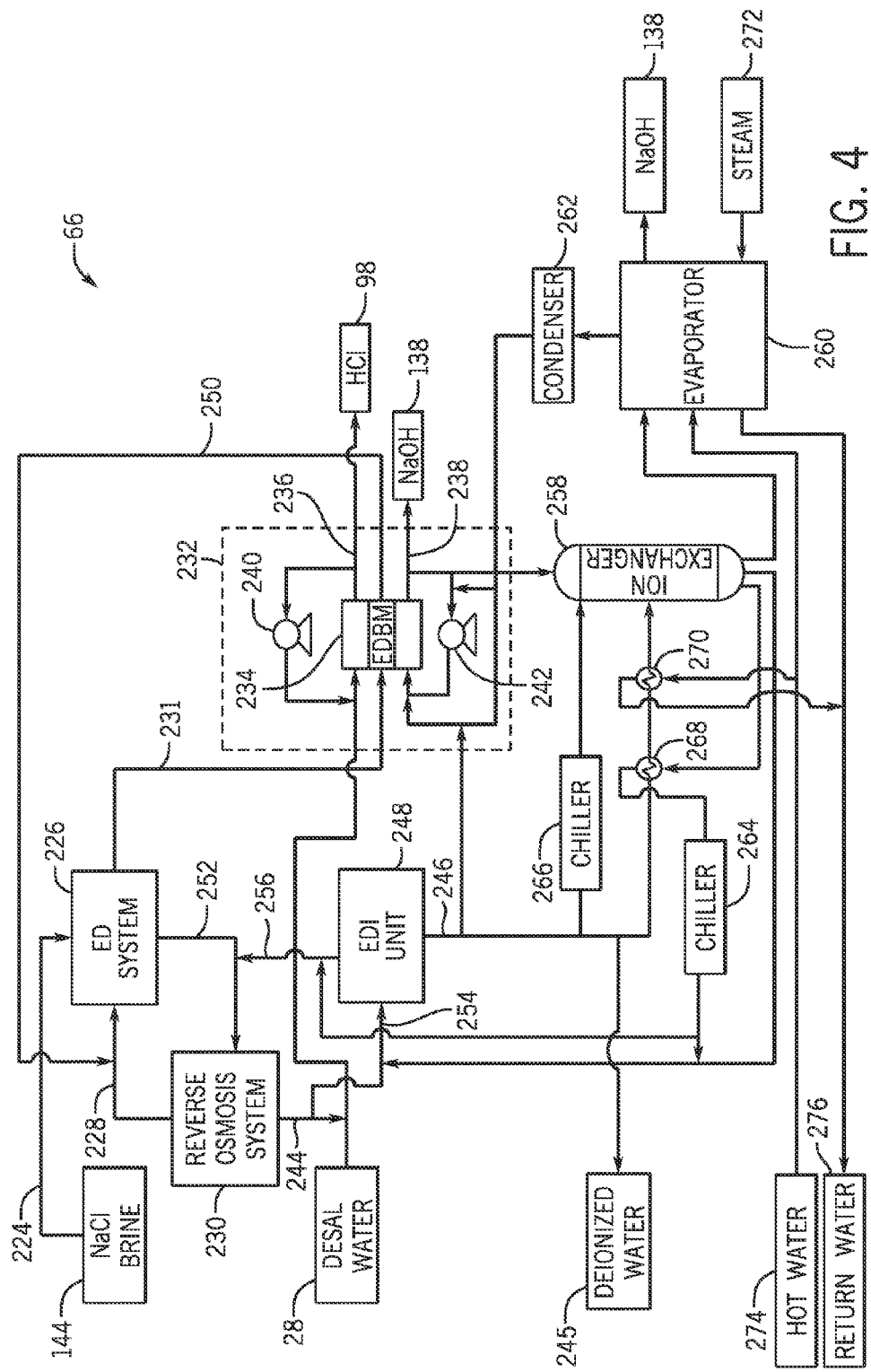
FIG. 4 is a block diagram of an embodiment of a hydrochloric acid (HCl) and sodium hydroxide (NaOH) production system, in accordance with aspects of the present disclosure.

FIG. 4 is a block diagram of an embodiment of the hydrochloric acid (HCl) and sodium hydroxide (NaOH) production system 66. A portion of the partially concentrated softened NaCl brine 144 (e.g., approximately 200 to 220 g/l NaCl) may be used to produce the HCl 98 and the NaOH 138 used by the mineral removal system 32. The NaCl brine 144 is routed via an input 224 to an ED system 226 (e.g., a feed ED unit) that includes non-permselective cation and anion membranes. The ED system 226 selectively extracts NaCl from a recycled lean brine stream received via an input 228 from a non-permeate of an RO system 230 (e.g., approximately 70 to 90 g/l NaCl), thereby increasing the NaCl concentration in the ED system 226 to near saturation (e.g., approximately 260-300 g/l NaCl, having a pH of approximately 7.5). In certain embodiments, a NF unit may be added to purify the recycled lean brine stream received via the input 228 before it is recycled to the ED system 226. In such embodiments, the NF non-permeate (e.g., containing sodium sulfate) may be routed to the gypsum removal system 112. Moreover, the NF permeate may be routed to the ED system 226. As may be appreciated, the removal of sodium sulfate by the NF unit may reduce sulfuric acid contamination in the HCl, thereby facilitating HCl exportation and/or sale.

The concentrated brine from the ED system 226 is routed via an output 231 to an electrodialysis bipolar membrane (EDBM) system 232 having a three cell EDBM 234 (e.g., Electromat Electrodialysis and Bipolar Electrodialysis manufactured by GE Power and Water of Trevose, Pa.). Within the EDBM 234, chloride is extracted from the concentrated brine to produce dilute (e.g., approximately 4 to 7 wt %) HCl 98 that is provided via a first output 236 of the EDBM 234. Furthermore, sodium is extracted from the concentrated brine to produce dilute (e.g., approximately 4 to 10 wt %) NaOH 138 that is provided via a second output 238 of the EDBM 234. The HCl and NaOH streams are recirculated using pumps 240 and 242 to increase the concentration of the HCl 98 and the NaOH 138 to the desired concentration levels. Furthermore, desalinated makeup water 28, RO permeate provided by an output 244 from the RO system 230, and/or deionized water 245 provided via an output 246 from an electrodeionizer (EDI) unit 248 may be added to the EDBM 234 to maintain the desired HCl 98 and NaOH 138 concentrations.

A softened lean brine (e.g., having approximately 70 to 90 g/l NaCl) is provided via an output 250 from the EDBM 234 and is routed to the ED system 226 in which a substantial portion of the NaCl is extracted, thereby increasing the concentration of the feed brine provided to the EDBM 234. The diluate stream (e.g., having approximately 20 to 30 g/l NaCl) from the ED system 226 is provided via an output 252 and is routed to the RO system 230. In certain embodiments, the RO permeate may be routed to an input 254 of the EDI unit 248 to produce the deionized water 245 (e.g., demineralized water). The NaCl brine from the EDI unit 248 is recycled to the RO system 230 via an output 256 for NaCl and/or water recovery.

A portion of the caustic (e.g., NaOH 138) may be purified by an ion exchanger 258. After being purified by the ion exchanger 258, the caustic may have at least approximately 10 wt % NaOH and/or less than 10 ppm Cl. Moreover, the caustic may be concentrated by an evaporator 260 to produce sodium hydroxide with industrial purity and concentration for export (e.g., NaOH 138 having at least approximately 50 wt % NaOH and/or less than 50 ppm Cl). The condensate from the caustic evaporation may be provided to a condenser 262 and recycled to the caustic circulation loop of the EDBM 234, as illustrated. The spent deionized water from the ion exchanger 258 may be recycled to either the RO system 230 or the EDI unit 248 to remove the NaCl and recycle the water as feed deionized water for regeneration of the caustic ion exchange resin. Chillers 264 and 266 and/or heat exchangers 268 and 270 may be used to cool or heat one or more of the spent deionized water and/or the feed deionized water. Moreover, steam 272 and/or hot water 274 may be used to provide heat to the evaporator 260 and/or the heat exchanger 270. As may be appreciated, the steam 272 and/or the hot water 274 may be provided by the heating and power production system 74. Furthermore, return water 276 may be returned to the heating and power production system 74.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for removing minerals from a feed stream, comprising: a gypsum removal system configured to receive the feed stream having a first amount of gypsum, to extract at least a portion of the gypsum from the feed stream, and to produce a first output having a second amount of the gypsum less than the first amount of the gypsum; an electrodialysis (ED) system disposed downstream from and fluidly coupled to the gypsum removal system and configured to receive the first output from the gypsum removal system, to produce a second output comprising a substantially sulfate hardness free sodium sulfate solution, to produce a third output comprising a first sodium chloride solution, and to produce a fourth output comprising a first mineral solution; and a resin-based ion exchange brine softener disposed downstream from and fluidly coupled to the ED system and the gypsum removal system, wherein the resin-based ion exchange brine softener is configured to receive the first sodium chloride solution to generate a second sodium chloride solution and a second mineral solution, and to direct the second mineral solution to the gypsum removal system, wherein a first sodium chloride concentration of the first sodium chloride solution is less than a second sodium chloride concentration of the second sodium chloride solution, and wherein the resin-based ion exchange brine softener does not include an ion exchange membrane.

2. The system of claim 1, wherein the ED system comprises:
   a first ED unit configured to receive the first output from the gypsum removal system; to produce the second output comprising the substantially sulfate hardness free sodium sulfate solution, and to produce an intermediate output; and a second ED unit configured to receive the intermediate output, to produce the third output comprising the sodium chloride solution, and to produce the fourth output comprising the first mineral solution.

3. The system of claim 2, wherein the first ED unit comprises a plurality of cationic membranes and a first plurality of monovalent permselective anionic membranes, and the second ED unit comprises a plurality of monovalent permselective cationic membranes and a second plurality of monovalent permselective anionic membranes.

4. The system of claim 2, comprising a nanofiltration (NF) system configured to receive the substantially sulfate hardness free sodium sulfate solution from the first ED unit, to produce a permeate output, and to produce a non-permeate output.

5. The system of claim 4, wherein the permeate output comprises substantially filtered water and the non-permeate output comprises a sulfate solution.

6. The system of claim 5, wherein the sulfate solution is provided to the gypsum removal system.

7. The system of claim 1, comprising a magnesium hydroxide removal system fluidly coupled to the ED system and configured to receive the fourth output and to remove magnesium hydroxide from the fourth output.

8. The system of claim 7, comprising a calcium chloride removal system fluidly coupled to the magnesium hydroxide removal system and configured to produce a calcium chloride solution.

9. The system of claim 1, wherein the first output comprises less than approximately 5 g/l gypsum.

10. The system of claim 1, wherein the substantially sulfate hardness free sodium sulfate solution comprises less than approximately 200 mg/l of combined calcium, strontium, and barium.

11. A system for removing minerals from a feed stream, comprising: an electrodialysis (ED) system comprising: a first ED unit configured to receive the feed stream, to produce a first output comprising a substantially sulfate hardness free sodium sulfate solution, and to produce an intermediate output; a second ED unit configured to receive the intermediate output, to produce a second output comprising a first sodium chloride solution, and to produce a third output comprising a first mineral solution; a first resin-based ion exchange brine softener disposed downstream from and fluidly coupled to the second ED unit and configured to receive the first sodium chloride brine solution, to generate a fourth output comprising a second sodium chloride brine solution and a fifth output comprising a second mineral solution, wherein a first concentration of sodium chloride in the first sodium chloride solution is less than a second concentration of sodium chloride in the second sodium chloride solution, and a nanofiltration (NF) system fluidly coupled to the first ED unit and the first resin-based ion exchange brine softener, wherein the NF system is configured to receive the substantially sulfate hardness free sodium sulfate solution and at least a portion of the first mineral solution, and to produce a permeate output and a non-permeate output, and wherein the resin-based ion exchange brine softener does not include an ion exchange membrane.

12. The system of claim 11, wherein the first ED unit comprises a plurality of cationic membranes and a first plurality of monovalent permselective anionic membranes, and the second ED unit comprises a plurality of monovalent permselective cationic membranes and a second plurality of monovalent permselective anionic membranes.

13. The system of claim 11, wherein the permeate output comprises substantially filtered water and the non-permeate output comprises a sulfate solution.

14. The system of claim 13, wherein the sulfate solution is provided to a gypsum removal system.

15. The system of claim 11, comprising a magnesium hydroxide removal system fluidly coupled to the ED system and configured to receive the third output and to remove magnesium hydroxide from the third output.

16. The system of claim 15, comprising a calcium chloride removal system fluidly coupled to the magnesium hydroxide removal system and configured to produce a calcium chloride solution.

17. The system of claim 11, wherein the first ED unit comprises a first stage configured to receive the feed stream, to extract at least 50% of chloride compounds from the feed stream, and to produce a diluate output.

18. The system of claim 17, wherein the first ED unit comprises a second stage configured to receive the diluate output from the first stage and to produce the intermediate output.

19. The system of claim 11, comprising a second resin-based ion exchange brine softener fluidly coupled to the first ED unit, the first resin-based ion exchange brine softener, and the NF system, wherein the second resin-based ion exchange brine softener is configured to receive at least a portion of the substantially sulfate hardness free sodium sulfate solution from the first ED unit, at least a portion of the portion of the first mineral solution from the second ED unit, and at least a portion of the second sodium chloride solution from the first resin-based ion exchange brine softener, and to generate a third mineral solution, and wherein each of the resin-based ion exchange brine softeners does not include an ion exchange membrane.

* * * * *